United States Patent
Heo et al.

(10) Patent No.: US 10,674,146 B2
(45) Date of Patent: Jun. 2, 2020

(54) METHOD AND DEVICE FOR CODING RESIDUAL SIGNAL IN VIDEO CODING SYSTEM

(71) Applicant: LG ELECTRONICS INC., Seoul (KR)

(72) Inventors: Jin Heo, Seoul (KR); Eunyong Son, Seoul (KR); Jaeho Lee, Seoul (KR); Seungwook Park, Seoul (KR); Sehoon Yea, Seoul (KR); Junghak Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/764,685

(22) PCT Filed: Sep. 30, 2016

(86) PCT No.: PCT/KR2016/010983
§ 371 (c)(1),
(2) Date: Mar. 29, 2018

(87) PCT Pub. No.: WO2017/057953
PCT Pub. Date: Apr. 6, 2017

(65) Prior Publication Data
US 2018/0288409 A1    Oct. 4, 2018

Related U.S. Application Data

(60) Provisional application No. 62/234,667, filed on Sep. 30, 2015, provisional application No. 62/241,165, filed on Oct. 14, 2015.

(51) Int. Cl.
*H04N 19/105*    (2014.01)
*H04N 19/176*    (2014.01)
(Continued)

(52) U.S. Cl.
CPC ......... *H04N 19/105* (2014.11); *H04N 19/119* (2014.11); *H04N 19/124* (2014.11);
(Continued)

(58) Field of Classification Search
CPC .... H04N 19/105; H04N 19/14; H04N 19/129; H04N 19/119; H04N 19/70; H04N 19/61;
(Continued)

(56) References Cited

U.S. PATENT DOCUMENTS

| 2013/0003834 A1* | 1/2013 | Rojals | H04N 19/196 375/240.12 |
| 2013/0128985 A1* | 5/2013 | He | H04N 19/176 375/240.18 |

(Continued)

FOREIGN PATENT DOCUMENTS

| KR | 10-2014-0024958 | 3/2014 |
| KR | 10-2015-0050559 | 5/2015 |

(Continued)

*Primary Examiner* — Dramos Kalapodas
(74) *Attorney, Agent, or Firm* — Fish & Richardson P.C.

(57) ABSTRACT

An image decoding method according to the present invention comprises the steps of: deriving quantized transform coefficients by unit of sub-blocks in a transform unit on the basis of residual information included in a bitstream; deriving transform coefficients on the basis of the quantized transform coefficients; generating a residual sample on the basis of the transform coefficients; generating a prediction sample on the basis of an inter prediction or an intra prediction; and restoring an image on the basis of the residual sample and the prediction sample. According to the present invention, a quantity of data required for a residual signal can be reduced, and an overall coding efficiency can be improved.

8 Claims, 14 Drawing Sheets

(51) Int. Cl.
*H04N 19/124* (2014.01)
*H04N 19/44* (2014.01)
*H04N 19/90* (2014.01)
*H04N 19/119* (2014.01)
*H04N 19/129* (2014.01)
*H04N 19/70* (2014.01)
*H04N 19/14* (2014.01)
*H04N 19/18* (2014.01)
*H04N 19/61* (2014.01)

(52) U.S. Cl.
CPC ........... *H04N 19/129* (2014.11); *H04N 19/14* (2014.11); *H04N 19/176* (2014.11); *H04N 19/18* (2014.11); *H04N 19/44* (2014.11); *H04N 19/61* (2014.11); *H04N 19/70* (2014.11); *H04N 19/90* (2014.11)

(58) Field of Classification Search
CPC ........ H04N 19/18; H04N 19/90; H04N 19/44; H04N 19/124; H04N 19/176; H04N 19/48
See application file for complete search history.

(56) References Cited

U.S. PATENT DOCUMENTS

| | | | |
|---|---|---|---|
| 2013/0272384 A1* | 10/2013 | Yu | H04N 19/129 375/240.03 |
| 2013/0343448 A1* | 12/2013 | He | H04N 19/176 375/240.03 |
| 2014/0003529 A1* | 1/2014 | Joshi | H04N 19/13 375/240.18 |
| 2014/0086307 A1* | 3/2014 | Karczewicz | H04N 19/70 375/240.02 |

FOREIGN PATENT DOCUMENTS

| | | | | |
|---|---|---|---|---|
| KR | 10-2015-0058324 | | 5/2015 | |
| KR | 10-2015-0064116 | | 6/2015 | |
| KR | 20150064116 A | * | 6/2015 | ............. H04N 19/70 |
| WO | 2011-099789 | | 8/2011 | |
| WO | WO-2011099789 A2 | * | 8/2011 | ............. H04N 19/48 |

* cited by examiner

FIG. 5

| REVERSE SCAN ORDER | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| QUANTIZATION TRANSFORM COEFFICIENT | 0 | 0 | 0 | 0 | 0 | 0 | 1 | 1 | 1 | 1 | -2 | 0 | 1 | -3 | 3 | 10 |
| ENCODING OF NON-ZERO QUANTIZATION TRANSFORM COEFFICIENT INFORMATION | 0 | 0 | 0 | 0 | 0 | 0 | 1 | 1 | 1 | 1 | 1 | 0 | 1 | 1 | 1 | 1 |

FIG. 10

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| REVERSE SCAN ORDER | | | | | | | | | | | | | | | | |
| QUANTIZATION TRANSFORM COEFFICIENT | 0 | 0 | 0 | 0 | 0 | 0 | 1 | 0 | 0 | 0 | 0 | 0 | 1 | -1 | 0 | 1 |
| ENCODING OF NON-ZERO QUANTIZATION TRANSFORM COEFFICIENT INFORMATION | 0 | 0 | 0 | 0 | 0 | 0 | 1 | 0 | 0 | 0 | 0 | 0 | 1 | 1 | 0 | 1 |
| PERFORMING ENCODING WHEN ABSOLUTE VALUE IS LARGER THAN 1 | | | | | | | 0 | | | | | | 0 | 0 | | 0 |
| ENCODING OF SIGN OF QUANTIZATION TRANSFORM COEFFICIENT | | | | | | | 0 | | | | | | 0 | 1 | | 0 |

FIG. 11

| REVERSE SCAN ORDER | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| QUANTIZATION TRANSFORM COEFFICIENT | 0 | 0 | 0 | 0 | 0 | 0 | 1 | 0 | 0 | 0 | 0 | 0 | 1 | -1 | 0 | 1 |
| ENCODING OF NON-ZERO QUANTIZATION TRANSFORM COEFFICIENT INFORMATION | 0 | 0 | 0 | 0 | 0 | 0 | 1 | 0 | 0 | 0 | 0 | 0 | 1 | 1 | 0 | 1 |
| ARE VALUES OF ALL NON-ZERO QUANTIZATION TRANSFORM COEFFICIENTS 1? | | | | | | | 0 | | | | | | | | | 1 |
| ENCODING OF SIGN OF QUANTIZATION TRANSFORM COEFFICIENT | | | | | | | | | | | | | 0 | 1 | | 0 |

FIG. 12

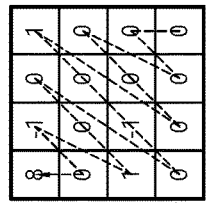

<previous>

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| REVERSE SCAN ORDER | | | | | | | | | | | | | | | | |
| QUANTIZATION TRANSFORM COEFFICIENT | 0 | 0 | 0 | 0 | 0 | 0 | 1 | 0 | -1 | 0 | 0 | 0 | 1 | 3 | 0 | 8 |
| ENCODING OF POSITIONAL INFORMATION OF NON-ZERO QUANTIZATION TRANSFORM COEFFICIENT | 0 | 0 | 0 | 0 | 0 | 0 | 1 | 0 | 1 | 0 | 0 | 0 | 1 | 1 | 1 | 1 |
| PERFORMING ENCODING WHEN ABSOLUTE VALUE IS LARGER THAN 1 | | | | | | | | 0 | 0 | | | | 0 | 0 | | |
| PERFORMING ENCODING WHEN ABSOLUTE VALUE IS LARGER THAN 2 | | | | | | | | | | | | | | | | 1 |
| ENCODING OF SIGN OF QUANTIZATION TRANSFORM COEFFICIENT | | | | | | | 0 | | 1 | | | | 0 | 1 | | 0 |
| ENCODING OF QUANTIZATION TRANSFORM COEFFICIENT LARGER THAN 2 | | | | | | | | | | | | | | | | 6 |

<new>

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| REVERSE SCAN ORDER | | | | | | | | | | | | | | | | |
| QUANTIZATION TRANSFORM COEFFICIENT | 0 | 0 | 0 | 0 | 0 | 0 | 1 | 0 | -1 | 0 | 0 | 0 | 1 | 3 | 0 | 8 |
| ENCODING OF POSITIONAL INFORMATION OF NON-ZERO QUANTIZATION TRANSFORM COEFFICIENT | 0 | 0 | 0 | 0 | 0 | 0 | 1 | 0 | 1 | 0 | 0 | 0 | 1 | 1 | 1 | 1 |
| ARE VALUES OF ALL NON-ZERO AC QUANTIZATION TRANSFORM COEFFICIENTS 1? | | | | | | | | 1 | | | | | | | | |
| PERFORMING ENCODING WHEN ABSOLUTE VALUE IS LARGER THAN 2 | | | | | | | | | | | | | | | | 1 |
| ENCODING OF SIGN OF QUANTIZATION TRANSFORM COEFFICIENT | | | | | | | 0 | | 1 | | | | 0 | 1 | | 0 |
| ENCODING OF QUANTIZATION TRANSFORM COEFFICIENT LARGER THAN 2 | | | | | | | | | | | | | | | | 6 |

METHOD AND DEVICE FOR CODING RESIDUAL SIGNAL IN VIDEO CODING SYSTEM

CROSS-REFERENCE TO RELATED APPLICATIONS

This application is the National Stage filing under 35 U.S.C. 371 of International Application No. PCT/KR2016/010983, filed on Sep. 30, 2016, which claims the benefit of U.S. Provisional Applications No. 62/234,667 filed on Sep. 30, 2015 and No. 62/241,165 filed on Oct. 14, 2015, the contents of which are all hereby incorporated by reference herein in their entirety.

BACKGROUND OF THE INVENTION

Field of the Invention

The present invention relates to technology for video coding, and more particularly, to a method and a device for coding a residual signal in a video coding system.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

The present invention provides a method and a device for increasing coding efficiency.

The present invention also provides a method and a device for efficiently coding a residual signal.

The present invention also provides a method and a device for adaptively changing a sub-block size of a transform unit.

The present invention also provides a method and a device for scanning/decoding transform coefficients for one or more sub-blocks of the transform unit in a forward scan order.

The present invention also provides a new syntax element for efficiently coding the transform coefficients.

In an aspect, an image decoding method performed by a decoding device is provided. The decoding method includes: deriving quantized transform coefficients by unit of sub-blocks in a transform unit on the basis of residual information included in a bitstream; deriving transform coefficients on the basis of the quantized transform coefficients; generating a residual sample on the basis of the transform coefficients; generating a prediction sample on the basis of an inter prediction or an intra prediction; and restoring an image on the basis of the residual sample and the prediction sample.

In another aspect, an image encoding method performed by an encoding device is provided. The encoding method includes: generating a prediction sample on the basis of an inter prediction or an intra prediction; generating a residual sample on the basis of a comparison of an original sample and the prediction sample; deriving transform coefficients on the basis of the residual sample; deriving quantized transform coefficients on the basis of the transform coefficients; and encoding and outputting residual information for the quantized transform coefficients by unit of sub-blocks in a transform unit (TU).

In yet another aspect, a decoding device performing image decoding is provided. The decoding device includes: an entropy decoding unit deriving quantized transform coefficients by unit of sub-blocks in a transform unit on the basis of residual information included in a bitstream; an dequantizer deriving transform coefficients on the basis of the quantized transform coefficients; an inverse transformer generating a residual sample on the basis of the transform coefficients; a predictor generating a prediction sample on the basis of an inter prediction or an intra prediction; and an adder restoring an image on the basis of the residual sample and the prediction sample.

In still yet another aspect, an encoding device performing image encoding is provided. The encoding device includes: a predictor generating a prediction sample on the basis of an inter prediction or an intra prediction; a subtractor generating a residual sample on the basis of a comparison of an original sample and the prediction sample; a transformer deriving transform coefficients on the basis of the residual sample; a quantizer deriving quantized transform coefficients on the basis of the transform coefficients; and an entropy encoder encoding and outputting residual information for the quantized transform coefficients by unit of sub-blocks in a transform unit (TU).

According to the present invention, it is possible to increase coding efficiency of a residual signal.

According to the present invention, transform coefficients can be derived by using less bits. As a result, a quantity of data required for a residual signal can be reduced, and an overall coding efficiency can be improved.

Further, according to the present invention, calculation complexity can be simplified and a processing speed can be enhanced in scanning and coding the transform coefficients.

BRIEF DESCRIPTION OF THE DRAWINGS

FIG. 5 illustrates a method for encoding non-zero quantization transform coefficients in a 4×4 sub-block.

FIG. 10 shows a method of encoding quantization transform coefficients in one sub-block in which non-zero coefficients exist according to the existing method.

FIG. 11 illustrates an example of encoding flag information indicating whether an absolute value of all non-zero quantization transform coefficients in the sub-block is 0 according to the method proposed by the present invention.

FIG. 12 exemplarily illustrates an encoding method for a sub-block including a DC component.

DESCRIPTION OF EXEMPLARY EMBODIMENTS

Figure 1:
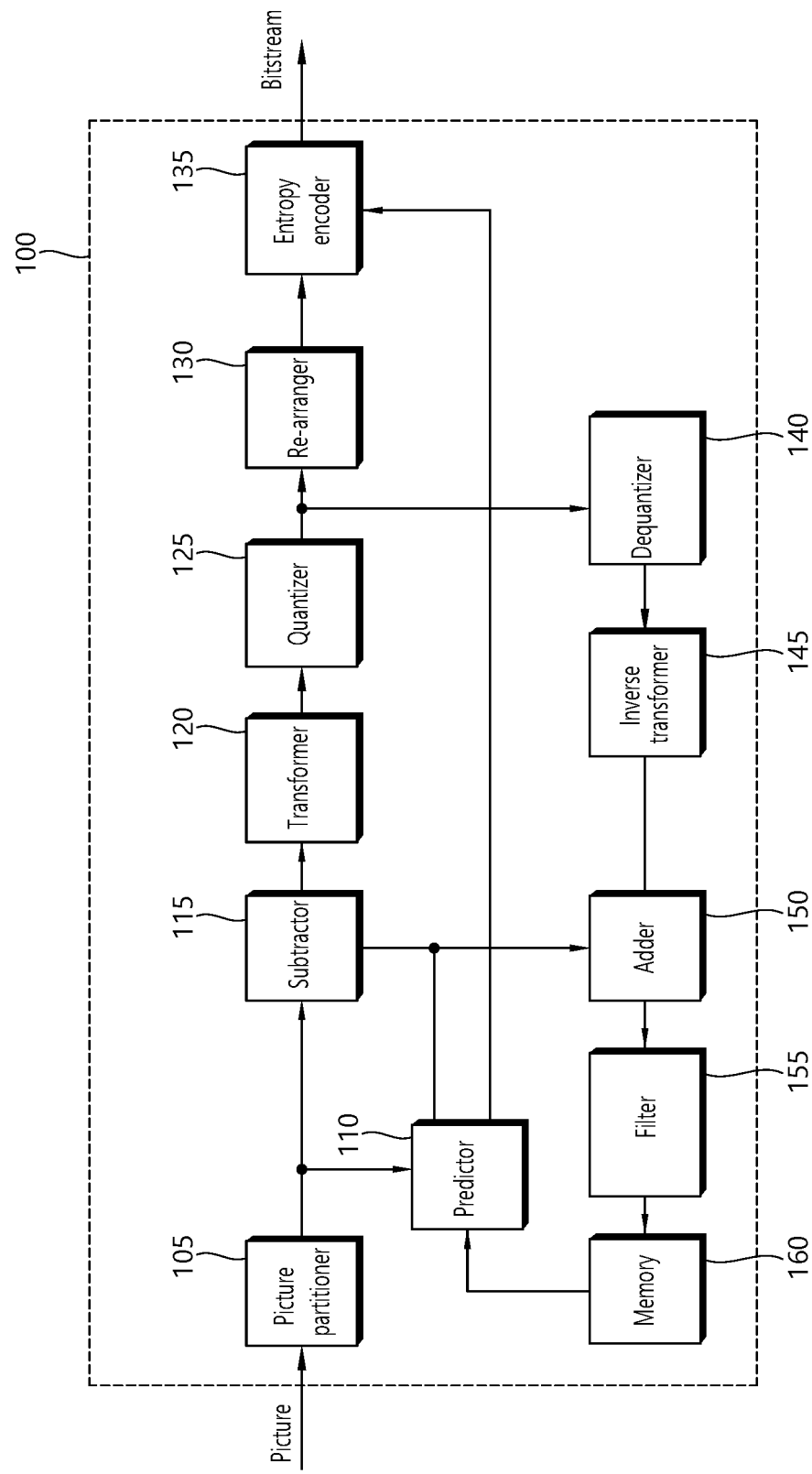
FIG. 1 is a schematic diagram illustrating a configuration of a video encoding device to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a 'sample' may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present invention is applicable.

Referring to FIG. 1, a video encoding device 100 includes a picture partitioner 105, a predictor 110, a subtractor 115, a transformer 120, a quantizer 125, a re-arranger 130, an entropy encoder 135, a dequantizer 140, an inverse transformer 145, an adder 150, a filter 255, and a memory 160.

The picture partitioner 105 may split an input picture into at least one processing unit. Here, a processing unit may be a coding unit (CU), a prediction unit (PU) or a transform unit (TU). The coding unit is a unit block of coding, and a coding tree unit (CTU) or a largest coding unit (LCU) may be split into coding units of deeper depth according to a quad-tree structure. In this case, the largest coding unit may be used as a final coding unit or a coding unit may be recursively split into coding units of deeper depth as necessary and a coding unit having an optimal size may be used as a final coding unit on the basis of coding efficiency according to video characteristics. When a smallest coding unit (SCU) is set, a coding unit cannot be split into a coding unit smaller than the smallest coding unit. Here, the final coding unit refers to a coding unit partitioned or split into a predictor or a transformer. A prediction unit is a block partitioned from a coding unit block and may be a unit block of sample prediction. Here, the prediction unit may be divided into sub blocks. A transform block can be split from a coding unit block according to the quad-tree structure and may be a unit block that derives a transform coefficient and/or a unit block that derives a residual signal from a transform coefficient.

Hereinafter, the coding unit may be called a coding block (CB), the prediction unit may be called a prediction block (PB), and the transform unit may be called a transform block (TB). The coding tree unit may be called a coding tree block (CTB).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 110 may perform prediction on a processing target block (hereinafter, a current block), and may generate a prediction block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block on the basis of a reference sample outside the current block in a picture to which the current block belongs (hereinafter, a current picture). In this case, the predictor 110 may derive the prediction sample on the basis of an average or interpolation of neighboring reference samples of the current block (case (i)), or may derive the prediction sample on the basis of a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block on the basis of a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned on the basis of a picture order count (POC) difference between a current picture and a corresponding reference picture. A POC corresponds to a display order and can be discriminated from a coding order.

The subtractor 115 generates a residual sample which is a difference between an original sample and a prediction sample. If the skip mode is applied, the residual sample may not be generated as described above.

The transformer 120 transforms residual samples in units of a transform block to generate a transform coefficient. The transformer 120 may perform transformation on the basis of the size of a corresponding transform block and a prediction mode applied to a coding block or prediction block spatially overlapping with the transform block. For example, residual samples can be transformed using discrete sine transform (DST) if intra-prediction is applied to the coding block or the prediction block overlapping with the transform block and the transform block is a 4×4 residual array and is transformed using discrete cosine transform (DCT) in other cases.

The quantizer 125 may quantize the transform coefficients to generate a quantized transform coefficient.

The re-arranger 130 rearranges quantized transform coefficients. The re-arranger 130 may rearrange the quantized transform coefficients in the form of a block into a one-dimensional vector through a coefficient scanning method. Although the re-arranger 130 is described as a separate component, the re-arranger 130 may be a part of the quantizer 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 140 dequantizes values (transform coefficients) quantized by the quantizer 125 and the inverse transformer 145 inversely transforms values dequantized by the dequantizer 135 to generate a residual sample.

The adder 150 adds a residual sample to a prediction sample to reconstruct a picture. The residual sample may be added to the prediction sample in units of a block to generate a reconstructed block. Although the adder 150 is described as a separate component, the adder 150 may be a part of the predictor 110.

The filter 155 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 155 may apply an adaptive loop filter (ALF) to the reconstructed picture. The ALF may be applied to the reconstructed picture to which deblocking filtering and/or sample adaptive offset has been applied.

The memory 160 may store a reconstructed picture or information necessary for encoding/decoding. The memory 160 may include decoded picture buffer (DPB). The DPB may store the reconstructed picture. Here, the reconstructed picture may be the reconstructed picture filtered by the filter 155. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
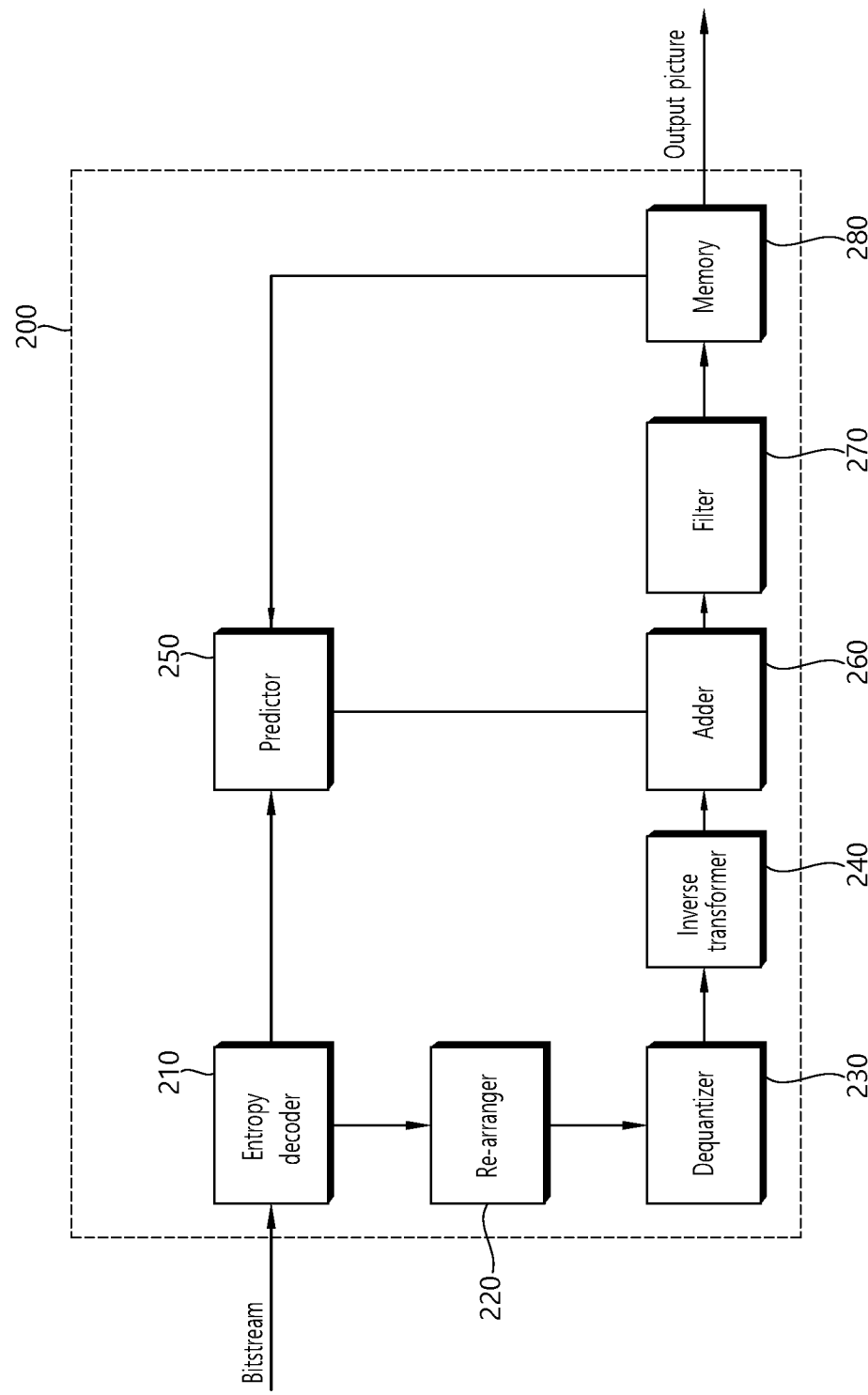
FIG. 2 is a schematic diagram illustrating a configuration of a video decoding device to which the present invention is applicable.

FIG. 2 briefly illustrates a structure of a video decoding device to which the present invention is applicable.

Referring to FIG. 2, a video decoding device 200 includes an entropy decoder 210, a re-arranger 220, a dequantizer 230, an inverse transformer 240, a predictor 250, an adder 260, a filter 270, and a memory 280.

When a bitstream including video information is input, the video decoding device 200 may reconstruct a video in association with a process by which video information is processed in the video encoding device.

For example, the video decoding device 200 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 210 may parse the bitstream to output information required for video reconstruction or picture reconstruction. For example, the entropy decoder 210 may decode information in the bitstream on the basis of a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of a symbol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 220.

The re-arranger 220 may rearrange the quantized transform coefficients into a two-dimensional block form. The re-arranger 220 may perform rearrangement corresponding to coefficient scanning performed by the encoding device. Although the re-arranger 220 is described as a separate component, the re-arranger 220 may be a part of the quantizer 230.

The dequantizer 230 may de-quantize the quantized transform coefficients on the basis of a (de)quantization parameter to output a transform coefficient. In this case, information for deriving a quantization parameter may be signaled from the encoding device.

The inverse transformer 240 may inverse-transform the transform coefficients to derive residual samples.

The predictor 250 may perform prediction on a current block, and may generate a prediction block including prediction samples for the current block. A unit of prediction performed in the predictor 250 may be a coding block or may be a transform block or may be a prediction block.

The predictor 250 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 250 may derive a prediction sample for a current block on the basis of a neighboring reference sample in a current picture. The predictor 250 may derive the prediction sample for the current block by applying a directional mode or a non-directional mode on the basis of the neighboring reference sample of the current block. In this case, a prediction mode to be applied to the current block may be determined by using an intra-prediction mode of a neighboring block.

In the case of inter-prediction, the predictor 250 may derive a prediction sample for a current block on the basis of a sample specified in a reference picture according to a motion vector. The predictor 250 may derive the prediction sample for the current block using one of the skip mode, the merge mode and the MVP mode. Here, motion information required for inter-prediction of the current block provided by the video encoding device, for example, a motion vector and information about a reference picture index may be acquired or derived on the basis of the information about prediction.

In the skip mode and the merge mode, motion information of a neighboring block may be used as motion information of the current block. Here, the neighboring block may include a spatial neighboring block and a temporal neighboring block.

The predictor 250 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 250 may derive the motion vector of the current block using the merge index.

When the MVP (Motion Vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 250 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 250 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 260 can add a residual sample to a prediction sample to reconstruct a current block or a current picture. The adder 260 may reconstruct the current picture by adding the residual sample to the prediction sample in units of a block. When the skip mode is applied, a residual is not transmitted and thus the prediction sample may become a reconstructed sample. Although the adder 260 is described as a separate component, the adder 260 may be a part of the predictor 250.

The filter 270 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 280 may store a reconstructed picture or information necessary for decoding. The memory 280 may include decoded picture buffer (DPB). The DPB may store the reconstructed picture. Here, the reconstructed picture may be the reconstructed picture filtered by the filter 270. For example, the memory 280 may store pictures used for inter-prediction. Here, the pictures used for inter-prediction may be designated according to a reference picture set or a reference picture list. A reconstructed picture may be used as a reference picture for other pictures. The memory 280 may output reconstructed pictures in an output order.

As described above, in the video coding system, a prediction block (including prediction samples) is generated for a target block to be encoded through an inter prediction method or an intra prediction method and the encoding device may generate a residual signal based on an original block and the prediction block for the target block. The residual signal may be transmitted to the decoding device through transformation, quantization, and entropy encoding. The transformation may be performed by unit of TU and (quantized) transform coefficients may be generated through the transformation and quantization. Most of the generated transform coefficients have a value of 0 and most of non-zero coefficients are concentrated on a DC component and a low-frequency component. Therefore, by using such a characteristic, the TU may be divided into several sub-blocks and the (quantized) transform coefficients which exist in each sub-block may be efficiently entropy-coded.

In recent years, there has been a growing demand for images with a large resolution size and thus a larger-sized processing unit (e.g., CU, PU, or TU) may be used for coding efficiency. For example, if a TU of up to 32×32 is used in an HEVC in the related art, a processing unit such as a TU of a larger size (e.g., 64×64, 128×128, 256×256, etc.) may be used to improve coding efficiency.

According to an embodiment of the present invention, the sizes of the sub-blocks in the TU may be adaptively set according to the size of the TU.

For example, when the size of the TU is equal to or less than 32×32, the TU is divided into sub-blocks having a size of 4×4 to code each of the sub-blocks. Meanwhile, when the size of the TU exceeds 32×32 (e.g., 64×64, 128×128, 256×256, etc.), the TU may be divided into sub-blocks of 8×8 size or larger (e.g., 8×8, 16×16, 32×32, etc.) and each of the sub-blocks may be coded.

Therefore, in the coding method according to the present invention, when the size of the TU is equal to or larger than a predetermined size, the sizes of the sub-blocks derived from the TU may be adjusted, and non-zero (quantized) transform coefficients may be efficiently coded. For example, the encoding device may scan and encode the transform coefficients in each sub-block according to a predetermined scan order and output the transform coefficients in the form of a bitstream. The decoding device may derive the transform coefficients in each sub-block by decoding the bitstream and obtain residual samples for the TU by dequantizing/inversely transforming the transform coefficients in the TU.

Specifically, a method for dividing one TU into several sub-blocks and coding the sub-blocs may be described as follows.

Figure 3:
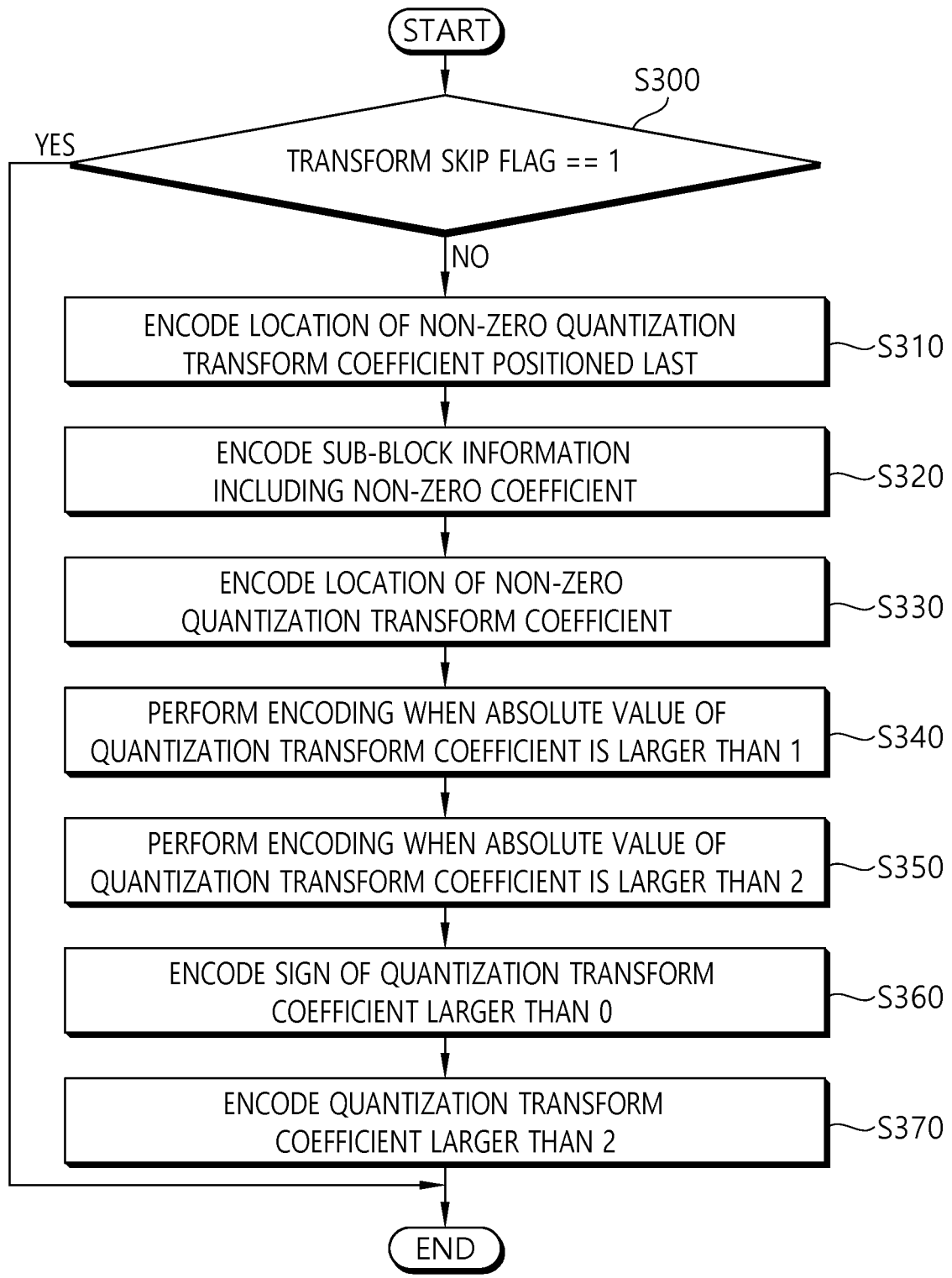
FIG. 3 exemplarily illustrates a residual signal encoding method in a TU.

FIG. 3 exemplarily illustrates a residual signal encoding method in a TU.

Referring to FIG. 3, the encoding device confirms a transform skip flag for the TU (S300). In performing residual signal encoding, a transform skip flag indicating whether transform skip is performed may be encoded first.

When a value of the transform skip flag is 1, the encoding device may directly encode (scaled) data for the residual signal without transforming the residual signal for the TU.

When the value of the transform skip flag is 0, the encoding device may perform a general residual encoding procedure.

The encoding device first encodes the location of a last non-zero quantization transform coefficient when performing scanning in a specific scanning order (S310). Herein, the specific scanning order may include an up-right diagonal scan order. In this case, the encoding device may encode the location of the last non-zero quantization transform coefficient by dividing an x-coordinate and a y-coordinate.

Subsequently, the encoding device divides the TU into multiple sub-blocks to encode information indicating whether the non-zero quantization transform coefficient exists in each sub-block (S320). The information may be encoded by using a syntax element indicating whether the non-zero quantization transform coefficient exists by unit of sub-block and in this case, the syntax element may not be encoded in a first sub-block and a sub-block in which the last non-zero quantization transform coefficient is positioned. This is because it is clear that a DC coefficient exists in the first sub-block and the non-zero quantization transform coefficient exists in the sub-block in which the last non-zero quantization coefficient is positioned. In addition, since it is clear that sub-blocks after the sub-block including the last non-zero quantization transform coefficient do not include the non-zero quantization transform coefficient, the syntax element is not encoded. Herein, the syntax element may include, for example, a coded_sub_block_flag syntax element. Further, herein, each of the sub-blocks may have the size of 4×4.

Then, the encoding device encodes quantization transform coefficient information in each sub-block in which the non-zero quantization transform coefficient exists. That is, the encoding device performs encoding for the sub-blocks in which the non-zero quantization transform coefficients exist.

Specifically, the encoding device first encodes the location of the non-zero quantization transform coefficient starting from a high-frequency region (i.e., from a lower right location of the sub-block) (S330). The encoding device then encodes whether an absolute value of the quantization transform coefficient is larger than 1 with respect to the case where the non-zero quantization transform coefficient is positioned (S340) and encodes whether the absolute value of the quantization transform coefficient is larger than 2 with respect to a case where the absolute value of the quantization transform coefficient is larger than 1 (S350). Thereafter, the encoding device encodes information indicating a sign of the quantization transform coefficient larger than 0 (S360) and encodes the absolute value of the quantization transform coefficient of which absolute value is larger than 2 (S370). In this case, the encoding device may reduce the number of bits corresponding to the value of the quantization transform coefficient by encoding a remaining value excluding a base level value. Herein, the base level value may be derived by adding 1 when the absolute value of the quantization transform coefficient is larger than 1 and adding 1 again when the absolute value of the quantization transform coefficient is larger than 2 while setting 1 as a base value in a correspondent coordinate in the sub-block.

Meanwhile, according to the present invention, a method for encoding the quantization transform coefficient in a sub-block including the sub-block information and the non-zero quantization transform coefficient may be changed and performed as follows. Herein, a method to be described below may be applied to, for example, a case where a current TU is a TU having the 64×64 size or larger.

Figure 4:
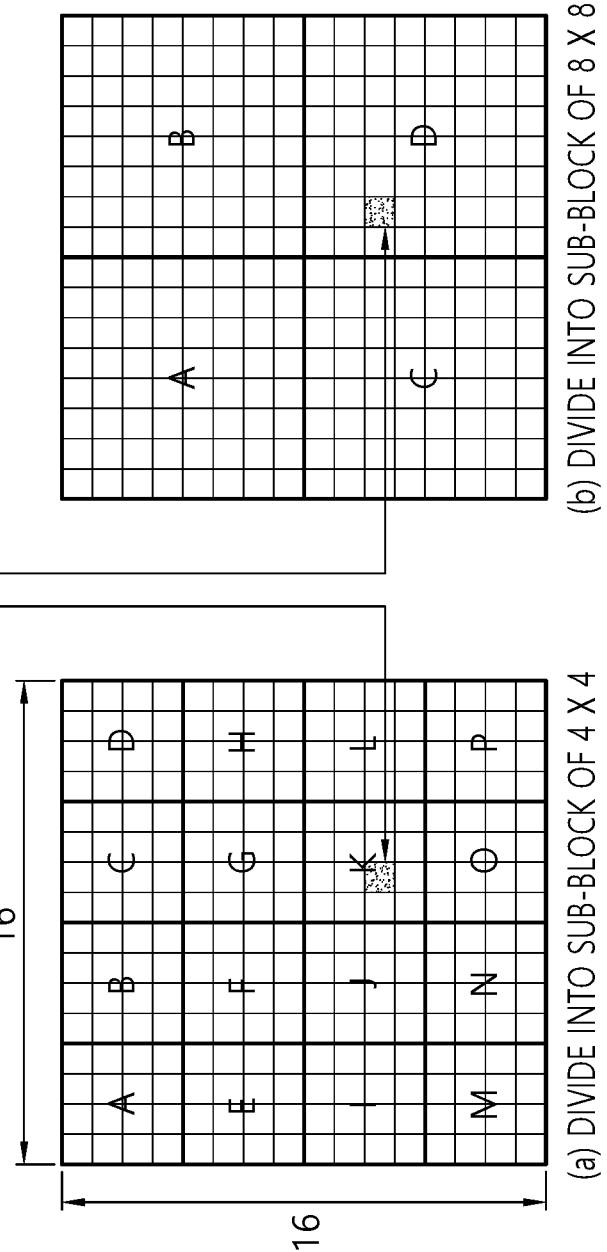
FIG. 4 illustrates sub-block information encoding according to an embodiment of the present invention.

FIG. 4 illustrates an example of sub-block information encoding according to an embodiment of the present invention. FIG. 4A illustrates an example of dividing a 16×16 TU into 4×4 sub-blocks and FIG. 4B illustrates an example of dividing an n×n TU into 8×8 sub-blocks. In the embodiment of FIG. 4B, n may be 16. However, this is an example and n may be a square of 2 equal to or larger than a predetermined value and may include, for example, 64, 128, and the like. Alternatively, n may include 16, 32, and the like.

A shaded portion in FIG. 4 indicates the location of the last non-zero quantization transform coefficient in a TU block. In this case, the aforementioned S320 procedure that encodes the information indicating whether the non-zero quantization transform coefficient exists in the sub-block may be performed as follows.

Referring to FIG. 4A, since each sub-block has the size of 4×4, the sub-blocks in the TU may be divided into sub-blocks A to P on the basis of a raster scan order or a Z scan order. In this case, the information indicating whether the non-zero quantization transform coefficient exists may be encoded, with respect to 11 remaining sub-blocks N, M, J, I, H, G, D, C, F, E, and B other than the sub-block K and a first sub-block A among the sub-blocks within a sub-block K including the last non-zero quantization transform coefficient.

On the contrary, as illustrated in FIG. 4B, when the TU is divided into sub-blocks having the size of 8×8, the sub-blocks in the TU may be divided into sub-blocks A to D on the basis of the raster scan order or the Z scan order. In this case, the information indicating whether the non-zero quantization transform coefficient exists may be encoded, with respect to 2 remaining sub-blocks B and C other than the sub-block D and the first sub-block A among the sub-blocks within the sub-block D including the last non-zero quantization transform coefficient. Accordingly, it is possible to reduce the case of encoding the information indicating whether THE non-zero quantization transform coefficient exists in the sub-block by changing the size of the sub-block as shown in FIG. 4B, thereby generating a smaller number of syntax elements and reducing the number of bits to be signaled. Such a method is more efficient when the TU size becomes larger like 64×64, 128×128, 256×256, or the like.

Although the size of the sub-block is illustrated as 8×8 in FIG. 4B, this is an example and the size of the sub-block may be set to a different size in consideration of the TU size and the coding efficiency. For example, when the size of the TU is 128×128 or 256×256, the 8×8 size of the sub-block also tends to be still smaller than the TU size. Specifically, 256 TUs of the 8×8 size may be included in the TU of the 128×128 size and 1024 sub-blocks of the 8×8 size may be included in the TU of the 256×256 size. When there are so many sub-blocks in the TU, it may be burdensome to encode the information of the sub-blocks. Thus, for large TUs, it is possible to perform the coding using the sub-block of the 16×16 or 32×32 size larger than the 8×8 size. For example, one or more thresholds are set, and the sub-block of the 8×8 size may be used when the size of the TU is larger than a first threshold and the sub-block of the size 16×16 or 32×32 when the size of the TU is larger than a second threshold.

Meanwhile, the quantization transform coefficients in the sub-block including the non-zero quantization transform coefficients described in and after S330 may be encoded as follows.

FIG. 5 illustrates a method for encoding non-zero quantization transform coefficients in a 4×4 sub-block.

As illustrated in FIG. 5, while the locations of 16 coefficients in the 4×4 sub-block are searched in a reverse scan order of the specific scan order, it is encoded whether the value of the coefficient at the corresponding location is 0. Herein, the specific scanning order may include the up-right diagonal scan order as described above. In this case, while all locations are searched based on the reverse scan order, it is checked whether the value of the coefficient at the corresponding location is 0 and thereafter, the absolute values and signs of the non-zero quantization transform coefficients are encoded.

Meanwhile, according to the present invention, when the TU is divided into sub-blocks having the size of 8×8 or larger, the non-zero quantization transform coefficients in the sub-blocks may be encoded as follows.

Figure 6:
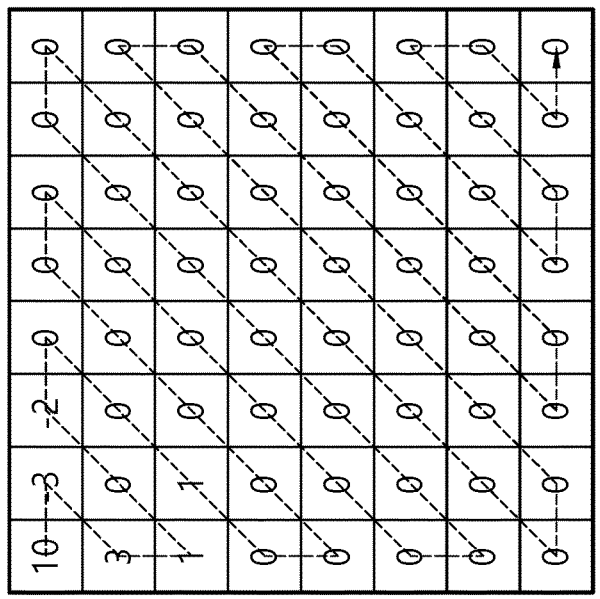
FIG. 6 illustrates a method for encoding the non-zero quantization transform coefficients in an 8×8 sub-block.

FIG. 6 illustrates a method for encoding the non-zero quantization transform coefficients in an 8×8 sub-block.

As illustrated in FIG. 6, the non-zero quantization transform coefficients in the 8×8 sub-block are generally concentrated in a low frequency region (i.e., the upper left side) according to the characteristics of frequency transform used in the video coding system. In this case, when the existing quantization transform coefficient encoding method is used as it is, a total of 64 pieces of information need to be encoded and the larger the size of the sub-block, the larger the amount of information to be encoded.

Therefore, in the proposed method, non-zero quantization transform coefficient encoding may be performed while the non-zero quantization transform coefficient information encoding is performed. In this case, the encoding may be performed from the low frequency region based on an upper left position. That is, according to an embodiment of the present invention, the quantization transform coefficients may be encoded from the upper left position based on a forward scan order rather than the reverse scan order.

In this case, as illustrated in FIG. 6, the flag information indicating whether each of the non-zero quantization transform coefficients is the last non-zero quantization transform coefficient may be encoded. In this case, according to the example of FIG. 6, fifteen pieces of information are encoded to represent the non-zero quantization transform coefficients (of course, additional information needs to be encoded to represent the coefficient values of the non-zero quantization transform coefficients) and in this case, according to the existing method, the amount of information to be encoded may be reduced as compared with the case where 64 pieces of information needs to be encoded. Meanwhile, this is an example and as another example, the flag information indicating whether each of the non-zero quantization transform coefficients is the last non-zero quantization transform coefficient is not encoded, but positional information of the last non-zero quantization transform coefficient may be encoded and signaled. For example, when the number of non-zero quantization transform coefficients in the sub-block is large, in the case where the flag information indicating whether each of the non-zero quantization transform coefficients is the last non-zero quantization transform coefficient is encoded, relatively many bits may be required and in this case, the position (coordinate) information of the last non-zero quantization transform coefficient in the sub-block itself is encoded to reduce the amount of information to be encoded and the quantity of bits to be transmitted.

The decoding device may decode the non-zero quantization transform coefficient information and the last non-zero quantization transform coefficient information in the sub-block in the same order as in the case of encoding. That is, according to the present invention, the quantization transform coefficients may be decoded from the upper left position based on the forward scan order rather than the reverse scan order. The decoding device may decode the non-zero quantization transform coefficient information from the low-frequency region in the sub-block and decode the last non-zero quantization transform coefficient information in the sub-block. When the currently decoded non-zero quantization transform coefficient is the last non-zero quantization transform coefficient in the sub-block, the decoding device may end the decoding of the non-zero coefficients for the sub-block. Alternatively, the flag information indicating whether each of the non-zero quantization transform coefficients is the last non-zero quantization transform coefficient is not received/decoded, but the positional information of the last non-zero quantization transform coefficient may be received/decoded with respect to the sub-block.

Meanwhile, in some cases, the non-zero quantization coefficients may be evenly distributed in the sub-block. For example, in the case of some sub-blocks in the TU, the non-zero quantization coefficients are gathered at an upper left end, but in other sub-blocks, the non-zero quantization coefficients may be evenly distributed. In the case where the non-zero quantization coefficients are evenly distributed in the sub-block, the amount of information to be encoded/decoded may increase when encoding/decoding is performed in the forward scan order from the upper left position of the sub-block according to the method. Therefore, the method according to the present invention is not applied to all sub-blocks in the TU, but variably selectively applied to the sub-blocks, thereby optimizing the coding efficiency.

Figure 7:
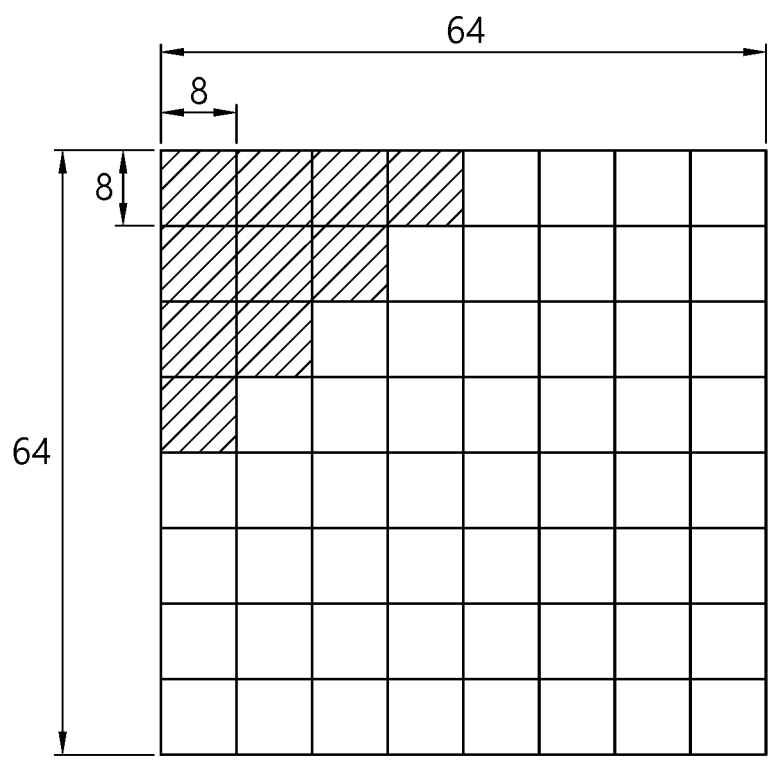
FIG. 7 illustrates an example in which the residual signal coding method according to the present invention is variably applied by unit of sub-block.

FIG. 7 illustrates an example in which the residual signal coding method according to the present invention is variably applied by unit of sub-block.

Referring to FIG. 7, the TU of the 64×64 size may be divided into 8×8 sub-blocks. In general, when frequency transformation is performed, residual information is concentrated in the low-frequency region (upper left side of the TU). Therefore, the residual signal coding method according to the present invention may be selectively applied to specific sub-blocks rather than applying the residual signal coding method to all 8×8 sub-blocks. For example, the shaded portion in FIG. 7 may be regarded as the sub-blocks in the low-frequency region (hereinafter referred to as first sub-blocks) and for the first sub-blocks, the non-zero quantization transform coefficient information is encoded/decoded in the reverse scan order according to the existing method and for remaining second sub-blocks, the non-zero quantization transform coefficient information and the last non-zero quantization transform coefficient information in the sub-blocks according to the method of the present invention, thereby increasing the coding efficiency.

A criterion for dividing the first sub-blocks (first group) and the second sub-blocks (second group) may be predetermined. Alternatively, the encoding device may signal information indicating a specific horizontal axis and/or vertical axis to the decoding device. For example, the encoding device may attempt encoding and decoding by applying various dividing methods and signal optimal division information to the decoding device based on rate-distortion optimization (RDO). In this case, the encoding device may signal division information indicating a specific x-coordinate and/or y-coordinate in the TU. In this case, the residual signal coding method (first residual signal coding method) according to the existing method is applied to the sub-blocks positioned on a left side of the specific x-coordinate and/or an upper side of the specific y-coordinate and the residual signal coding method (second residual signal coding method) according to the proposed method may be applied to the remaining region. Alternatively, information indicating an n-th sub-block on an x axis and/or an m-th sub-block on a y axis may be signaled to reduce the number of bits rather than sending coordinate information. In this case, the first residual signal coding method may be applied to left sub-blocks of the n-th sub-block (included or not included) on the x axis and/or upper sub-blocks of the m-th sub-block (included or not included) on the y axis and the second residual signal coding method may be applied to the remaining sub-blocks. In this case, in order to minimize the number of bits, the n-th sub-block and/or the m-th sub-block on the x axis may be set to be included in the first sub-blocks.

Figure 8:
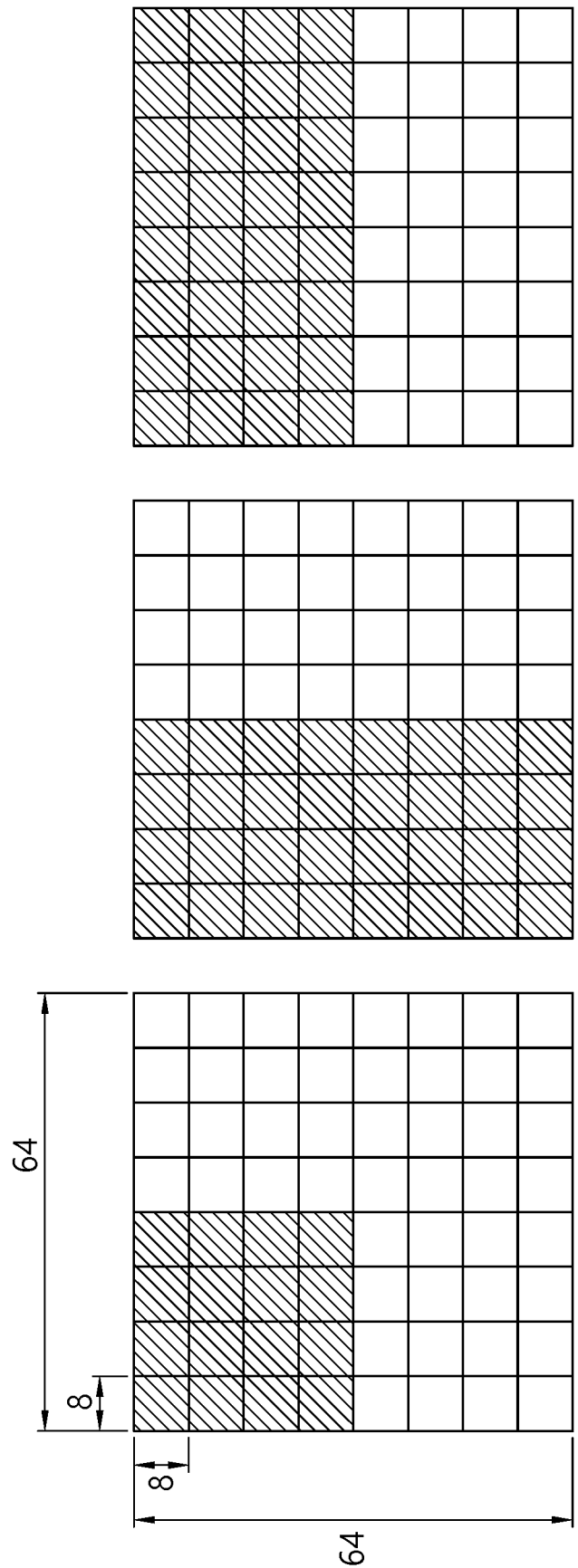
FIG. 8 illustrates another example in which the residual signal coding method according to the present invention is variably applied by unit of sub-block.

FIG. 8 illustrates another example in which the residual signal coding method according to the present invention is variably applied by unit of sub-block.

Referring to FIG. 8, for the first sub-blocks of the shaded portion, the non-zero quantization transform coefficient information is encoded/decoded in the reverse scan order according to the existing method and for remaining second sub-blocks, the non-zero quantization transform coefficient information and the last non-zero quantization transform coefficient information in the sub-blocks according to the method of the present invention, thereby increasing the coding efficiency.

Meanwhile, as various prediction methods and transformation methods, and the like have been recently developed, the prediction blocks may be more accurately generated and the residual signals may be efficiently transformed. As a result, the quantization transform coefficients generated through the transformation and quantization have smaller values. That is, most of the quantization transform coefficients have a value of 0 or 1. The coding efficiency may be improved through modification of the method for encoding the quantization transform coefficient by reflecting such characteristics.

Figure 9:
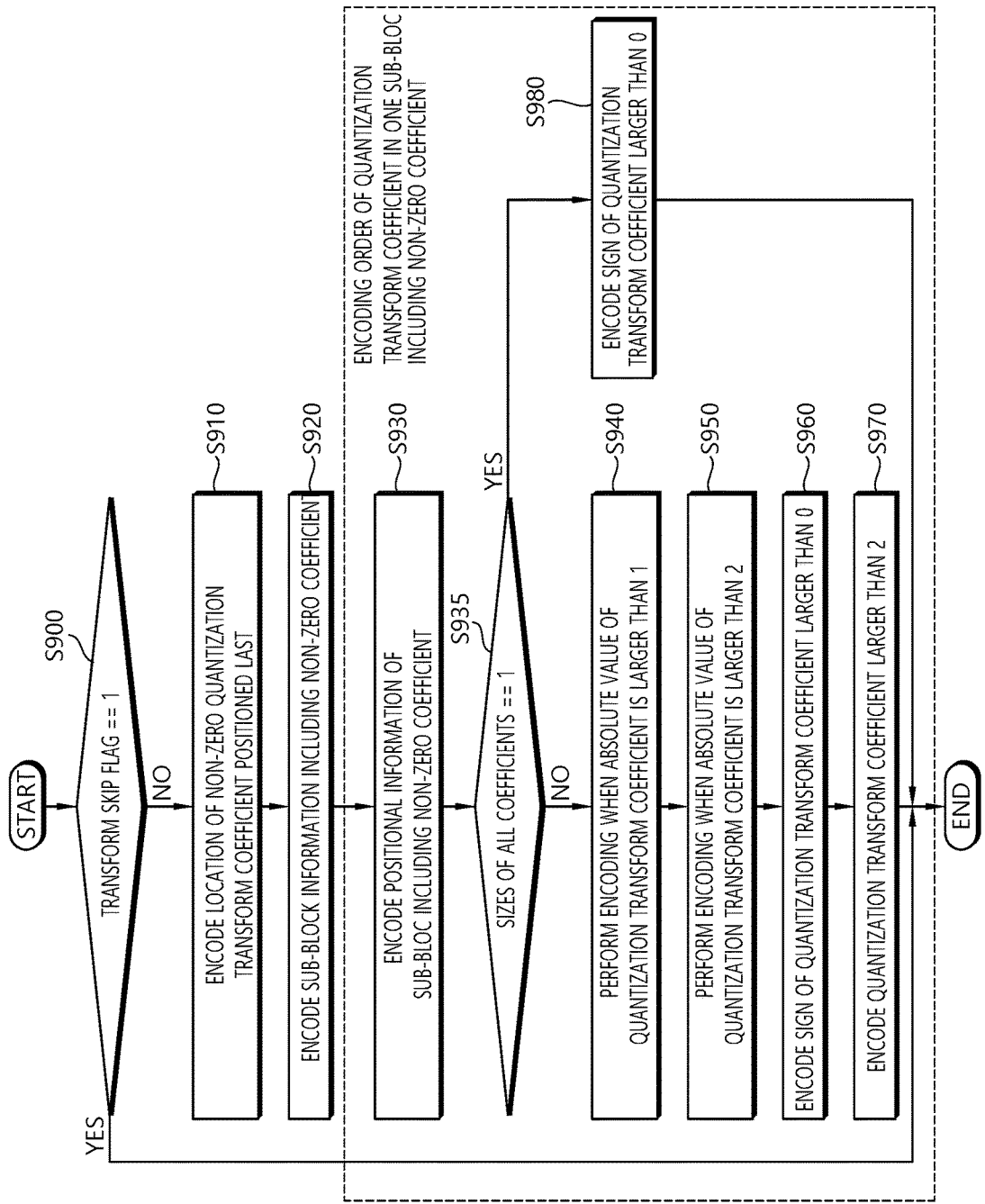
FIG. 9 illustrates the residual signal coding method according to another example of the present invention.

FIG. 9 illustrates the residual signal coding method according to another example of the present invention.

Referring to FIG. 9, the encoding device confirms a transform skip flag for the TU (S900). In performing residual signal encoding, the transform skip flag indicating whether transform skip is performed may be encoded first.

When a value of the transform skip flag is 1, the encoding device may directly encode (scaled) data for the residual signal without transforming the residual signal for the TU.

When the value of the transform skip flag is 0, the encoding device may perform a general residual encoding procedure.

The encoding device first encodes the location of a last non-zero quantization transform coefficient when performing scanning in a specific scan order (S910). Herein, the specific scanning order may include an up-right diagonal scan order. In this case, the encoding device may encode the location of the last non-zero quantization transform coefficient by dividing an x-coordinate and a y-coordinate.

Subsequently, the encoding device divides the TU into multiple sub-blocks to encode information indicating whether the non-zero quantization transform coefficient exists in each sub-block (S920). The information may be encoded by using a syntax element indicating whether the non-zero quantization transform coefficient exists by unit of sub-block and in this case, the syntax element may not be encoded in a first sub-block and a sub-block in which the last non-zero quantization transform coefficient is positioned. Herein, each of the sub-blocks may have the size of 4×4.

Then, the encoding device encodes quantization transform coefficient information in each sub-block in which the non-zero quantization transform coefficient exists. The encoding device performs encoding for the sub-blocks in which the non-zero quantization transform coefficients exist.

Specifically, the encoding device first encodes the location of the non-zero quantization transform coefficient starting from a high-frequency region (i.e., from a lower right location of the sub-block) (S930).

Thereafter, the encoding device encodes flag information indicating whether the absolute value of all non-zero quantization transform coefficients in the sub-block is 1 (S935).

When the value of the flag information is 1, all of the absolute values of the quantization transform coefficients larger than 0 in the sub-block may be 1. The encoding device encodes the sign of the non-zero quantization transform coefficient in the sub-block (S980). Therefore, it is possible to distinguish whether the values of the non-zero quantization transform coefficients in the sub-block are +1 or −1.

When the value of the flag information is 0, the encoding device encodes whether the absolute value of the quantization transform coefficient is larger than 1 with respect to the non-zero quantization transform coefficient (S940) and encodes whether the absolute value of the quantization transform coefficient is larger than 2 with respect to a case where the absolute value of the quantization transform coefficient is larger than 1 (S950). Thereafter, the encoding device encodes information indicating a sign of the quantization transform coefficient larger than 0 (S960) and encodes the absolute value of the quantization transform coefficient of which absolute value is larger than 2 (S970). In this case, the encoding device may reduce the number of bits corresponding to the value of the quantization transform coefficient by encoding a remaining value excluding a base level value as described above.

FIG. 10 illustrates a method of encoding quantization transform coefficients in one sub-block in which non-zero coefficients exist according to the existing method.

As illustrated in FIG. 10, the positional information of the non-zero quantization transform coefficient is first encoded and information indicating whether the absolute value of the non-zero quantization transform coefficient is larger than 1 is then encoded. In the example of FIG. 10, since the absolute values of all the non-zero quantization transform coefficients in the sub-block is 1, encoding the information indicating whether the absolute value of the quantization transform coefficient is larger than 2 and the information on the absolute value of the quantization transform coefficient having the absolute value larger than 2 may be omitted and code information of the non-zero quantization transform coefficients may be encoded.

However, in recent years, as described above, the values of most quantization transform coefficients are concentrated in 0 or 1 according to the development of the prediction methods and the development of various transformation methods. Therefore, the values of most of the quantization transform coefficients in the sub-block have the value of 0 or 1. In this case, instead of encoding the quantization transform coefficients according to the existing method, the flag information indicating whether the absolute values of all the non-zero quantization transform coefficients is 1 is encoded, thereby improving the coding efficiency.

FIG. 11 illustrates an example of encoding flag information indicating whether an absolute value of all non-zero quantization transform coefficients in the sub-block is 1 according to the method proposed by the present invention.

Referring to FIG. 11, all of the absolute values of the non-zero quantization transform coefficients in the illustrated sub-block are 1, and therefore, the encoding device may encode the flag information indicating whether the absolute values of all non-zero quantization transform coefficients in the sub-band and thereafter, encode information indicating the sign of the non-zero quantization transform coefficient and end the encoding of the quantization transform coefficient in the sub-block. In this case, the amount of information to be encoded and transmitted may be reduced. That is, in the existing method, it is necessary to encode the information indicating whether the absolute values of all the non-zero quantization transform coefficients are larger than 1, but according to the present invention, one flag information transmitted by unit of sub-block and indicating whether the value of all the non-zero quantization coefficients in the sub-block is 1 are encoded, thereby improving the coding efficiency. According to the existing method as illustrated in FIG. 10, since the information indicating whether the absolute of each of the non-zero quantization transform coefficients in the sub-block is larger than 1 needs to be encoded, at least 4 bits are required, but according to the method proposed as illustrated in FIG. 11, the values of the non-zero quantization transform coefficients may be encoded by using 1-bit information. Therefore, in the case of the above example, the number of bits to be signaled may be reduced by approximately 3 bits.

If there is at least one coefficient having the absolute value of a non-zero quantization transform coefficient in one sub-block larger than 1, the flag information indicating whether all of the non-zero quantization coefficient values in the sub-block is 1 is encoded as 0 and all subsequent encoding processes are performed according to the existing method, which include encoding of the quantization transform coefficients larger than 0, encoding of the quantization transform coefficients larger than 2, and the like when the absolute value of the quantization transform coefficient is larger than 1 and when the absolute of the quantization transform coefficient is larger than 2. In this case, one bit may be wasted for the sub-block, but many bits may be reduced for other sub-blocks and residual signal coding efficiency may be improved on the whole in terms of the TU.

Meanwhile, in general, when optimized transformation and quantization processes are performed, most of the coefficients in the TU may have the absolute value of 0 or 1, but the first sub-block of the TU, that is, the sub-block positioned on the upper left end of the TU continuously includes a DC component at the upper left position and there is a high probability that the quantization transform coefficient of the DC component will have the absolute larger than 1. Therefore, for efficient coding, the quantization transform coefficient may be encoded by dividing the DC component and an AC component with respect to the first sub-block.

FIG. 12 exemplarily illustrates an encoding method for a sub-block including a DC component. FIG. 12 exemplarily illustrates a case where the absolute values of the quantization transform coefficients of the remaining AC components other than the quantization transform coefficients of the DC component is 1.

Referring to FIG. 12, the illustrated sub-block includes the DC component and the absolute value of the quantization transform coefficient of the DC component is 8. Therefore, when the proposed method is applied as it is, the flag information indicating whether all of the non-zero quantization coefficient values in the sub-block is 1 is continuously encoded as 0.

Therefore, in the present invention, by preparing for such a case, the flag information indicating whether all of the non-zero quantization coefficient values in the sub-block is 1 may be set to be applied only to the quantization transform coefficients of the AC component. That is, when the absolute values of all of the non-zero quantization transform coefficients of the AC component excluding the DC component are 1, the flag information may be encoded as 1. When the absolute values of all of the non-zero quantization transform coefficients of the AC component excluding the DC component are 1, the value of the flag information, which means that the values of all non-zero AC component quantization transform coefficients are 1, is encoded as 1. In this case, since it is possible to confirm from the flag information that the absolute values of all of the non-zero AC component quantization transform coefficients in the sub-block are 1, an encoding step for the case where the absolute value of the AC component quantization coefficient is larger than 1 may be omitted, the sign of the quantization transform coefficient may be encoded, and the encoding of the quantization transform coefficient may be ended.

Meanwhile, similarly to the existing method, in the case of the DC component quantization transform coefficient, the encoding of the information indicating whether the absolute value is larger than 1, the encoding of the information indicating whether the absolute value is larger than 2, the encoding of the sign of the quantization transform coefficient, and the encoding of the absolute value of the quantization transform coefficient larger than 2 are performed according to the existing method.

That is, when whether the absolute values of all of the non-zero AC component quantization transform coefficients are 1 is encoded, whether the absolute value is larger than 1 is encoded as the encoding of the quantization transform coefficient with respect to the DC component. Therefore, in the proposed method of FIG. 12, since the absolute value of all of the non-zero AC component quantization transform coefficients excluding the DC component are 1, the value of the flag information indicating whether the absolute values of all of the non-zero AC component quantization transform coefficients are 1 is 1 and in this case, since the absolute values of the quantization transform coefficient of the DC component is 8 and the absolute value thereof is thus larger than 1, the encoded value of the information on whether the absolute value is larger than 1 is 1. In the case of the AC component quantization transform coefficient, only the encoding of the sign of each quantization transform coefficient is performed. However, in the case of the DC component, the encoding of the information indicating whether the absolute value of the quantization transform coefficient is larger than 2 and the encoding of the absolute value of the quantization transform coefficient larger than 2 may be sequentially performed.

The image coding method including the residual signal coding method according to the present invention may be performed based on the following flowchart, for example.

Figure 13:
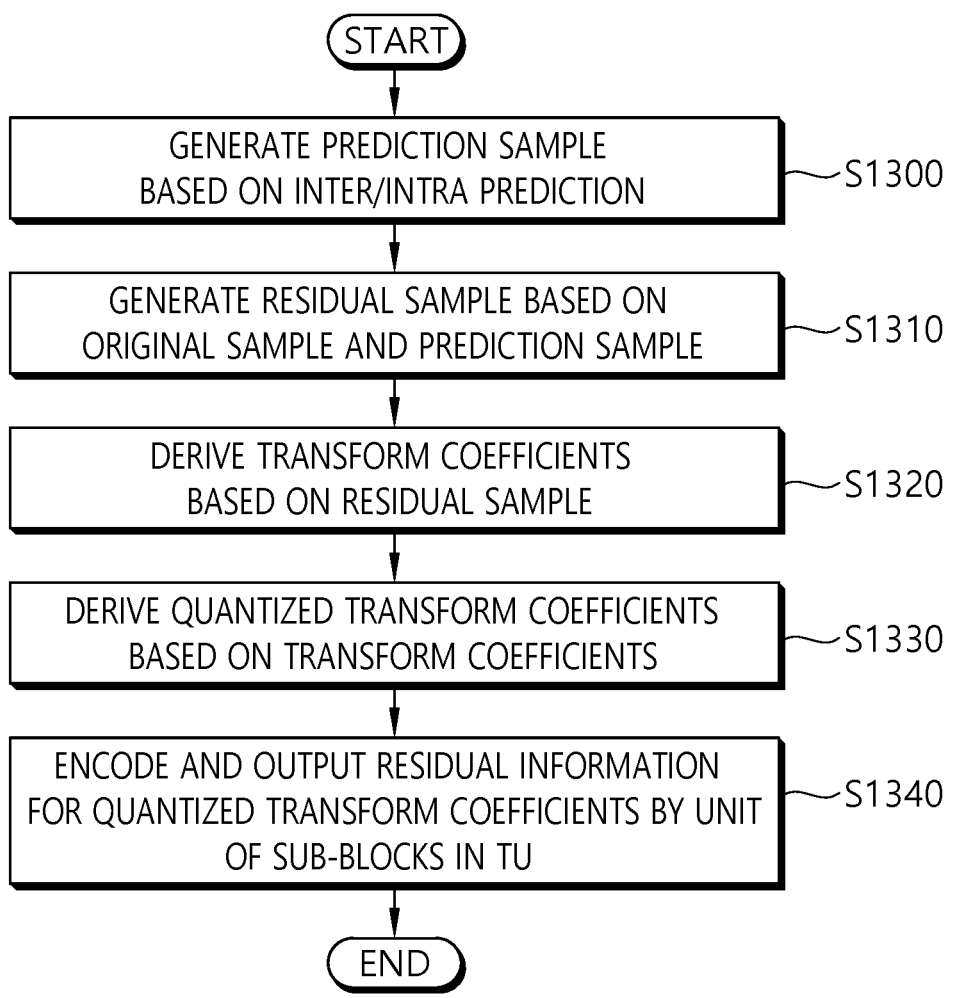
FIG. 13 schematically illustrates an image encoding method by an encoding device according to the present invention.

FIG. 13 schematically illustrates an image encoding method by an encoding device according to the present invention. The method disclosed in FIG. 13 may be performed by the encoding device disclosed in FIG. 1. Specifically, for example, S1300 of FIG. 13 may be performed by a predictor of the encoding device, S1310 may be performed by a subtractor of the encoding device, S1320 may be performed by a transformer of the encoding device, S1330 may be performed by a quantizer of the encoding device, and S1340 may be performed by an entropy encoder of the encoding device.

Referring to FIG. 13, the encoding device generates prediction samples based on inter prediction or intra prediction (S1300). In this case, the encoding device may determine inter prediction or intra prediction by unit of CU and determine an inter prediction mode or an intra prediction mode by unit of PU. Specifically, the encoding device may determine whether a merge mode or an AMVP mode is applied among the inter prediction modes by unit of PU based on RD cost. Further, the encoding device may determine whether to apply a specific directional prediction mode, a planar mode, or a DC mode among the intra prediction modes by unit of PU.

When performing the intra prediction, the encoding device may determine the intra prediction mode by unit of PU and generate the prediction samples using surrounding reference samples by unit of TU based on the determined intra prediction mode.

The encoding device generates a residual sample based on an original sample and the prediction sample (S1310). The encoding device compares the original sample of an original picture with the prediction sample obtained through the prediction and generates the residual sample based on a difference of the original sample and the prediction sample.

The encoding device generates transform coefficients based on the residual sample (S1320). The encoding device may transform the residual sample by unit of TU to obtain the transform coefficients in a frequency domain.

The encoding device derives quantized transform coefficients based on the transform coefficients (S1330). The encoding device derives the quantized transform coefficients by quantizing the transform coefficients.

The encoding device encodes and outputs residual information for the quantized transform coefficients by unit of sub-block in the TU (S1340). The encoding device may encode the residual information and output the encoded residual information in the form of a bitstream. The bitstream may be transmitted to the decoding device via a network or a storage medium.

The encoding device may encode the quantized transform coefficients by unit of sub-block based on the method described above with reference to FIGS. 3 and 9.

The encoding device may divide the TU into a plurality of sub-blocks having a size of 8×8 or larger. For example, when the size of the TU is 64×64 or larger, the encoding device may divide the TU into the plurality of sub-blocks having the size of 8×8 or larger.

The quantized transform coefficients may be sequentially encoded based on a specific scan order within the sub-block.

For example, the quantized transform coefficients may be sequentially encoded based on the up-right diagonal scan order from the upper end position of the sub-block. In this case, information indicating whether the absolute values of the quantization transform coefficients are 0 may be sequentially encoded based on the up-right diagonal scan order from the upper left position of the sub-block.

As another example, for the sub-blocks of the first group among the sub-blocks in the TU, the quantized transform coefficients may be encoded based on the up-right diagonal scan order from the upper left position of the sub-block and for the sub-blocks of the second group among the sub-blocks in the TU, the quantized transform coefficients may be encoded based on a reverse order of the up-right diagonal scan order from a lower right position of the sub-block. Herein, the sub-blocks of the first group may include upper left sub-blocks of the TU.

A criterion for dividing the sub sub-blocks of the first group and the sub-blocks of the second group may be predetermined. Alternatively, the encoding device may signal information indicating a specific horizontal axis and/or vertical axis to the decoding device. For example, the encoding device may signal division information indicating a specific x-coordinate and/or y-coordinate in the TU. In this case, the sub-blocks positioned on a left side of the specific x coordinate and/or on an upper side of the specific y coordinate may belong to the first group and the remaining sub-blocks may belong to the second group. As another example, the encoding device may signal information indicating an n-th sub-block in an x axis and/or an m-th sub-block in a y axis. In this case, the left sub-blocks of the n-th sub-block (included or not included) on the x-axis and/or the upper sub-blocks of the m-th sub-block (included or not included) may belong to the first group and the remaining sub-blocks may belong to the second group.

The residual information may include the information indicating the non-zero quantization transform coefficients of the sub-block and the flag information indicating whether the absolute values of all of the non-zero quantization transform coefficients in the sub-block are 1.

The encoding device may detect whether the absolute values of the quantization transform coefficients are 0 in order based on the specific scan order from the lower right position of the sub-block and generate information indicating the non-zero quantization transform coefficients. The encoding device may detect whether the absolute values of all of the non-zero quantization transform coefficients of the sub-block are 1 and generate flag information indicating whether magnitudes of the absolute values of all of the non-zero quantization transform coefficients in the sub-block are 1.

In this case, the residual information may include the information indicating the non-zero quantization transform coefficients of the sub-block and the flag information indicating whether the absolute values of all of the non-zero quantization transform coefficients in the sub-block are 1.

When the value of the flag information is 1, the encoding device may detect the signs of the quantization transform coefficients larger than 0 and generate information indicating the signs of the non-zero quantization transform coefficients in the sub-block.

In this case, the residual information may further include the information indicating the signs of the non-zero quantization transform coefficients in the sub-block.

When the sub-block includes the DC component quantization transform coefficient, the encoding device may sequentially detect whether the absolute values of the quantization transform coefficients are 0 based on the specific scan order from the lower right position of the sub-block and detect whether the absolute values of all of the non-zero AC component quantization transform coefficients excluding the DC component quantization transform coefficient of the sub-block are 1. In this case, the encoding device may generate the information indicating the non-zero quantization transform coefficients of the sub-block and the flag information indicating whether the absolute values of all of the non-zero AC component quantization transform coefficients in the sub-block are 1. In this case, the residual information may include the information indicating the non-zero quantization transform coefficients of the sub-block and the flag information indicating whether the absolute values of all of the non-zero AC component quantization transform coefficients in the sub-block are 1. In this case, the encoding device may derive the absolute value of the DC component quantization transform coefficient in the sub-block and generate information indicating whether the absolute value of the quantized transform coefficient of the DC component is larger than 1. Further, the encoding device may generate information indicating the sign of the quantization transform coefficient of the DC component. In addition, the encoding device may generate information indicating whether the absolute value of the quantization transform coefficient of the DC component is larger than 2 when the absolute value of the quantized transform coefficient of the DC component is larger than 1. Further, the encoding device may generate information indicating a (remaining) absolute value of the quantization transform coefficient of the DC component when the absolute value of the quantization transform coefficient of the DC component is larger than 2. In this case, the encoding device may reduce the number of bits corresponding to the value of the quantization transform coefficient by encoding a remaining value excluding a base level value. Herein, the base level value may be derived by adding 1 when the absolute value of the quantization transform coefficient is larger than 1 and adding 1 again when the absolute value of the quantization transform coefficient is larger than 2 while setting 1 as a base value.

In this case, the residual information may includes at least one of information indicating whether the absolute value of the quantization transform coefficient of the DC component is larger than 1, information indicating whether the absolute value of the quantization transform coefficient of the DC component is larger than 2, information indicating the sign of the quantization transform coefficient, and information indicating the (remaining) absolute value of the quantization transform coefficient of the DC component.

Figure 14:
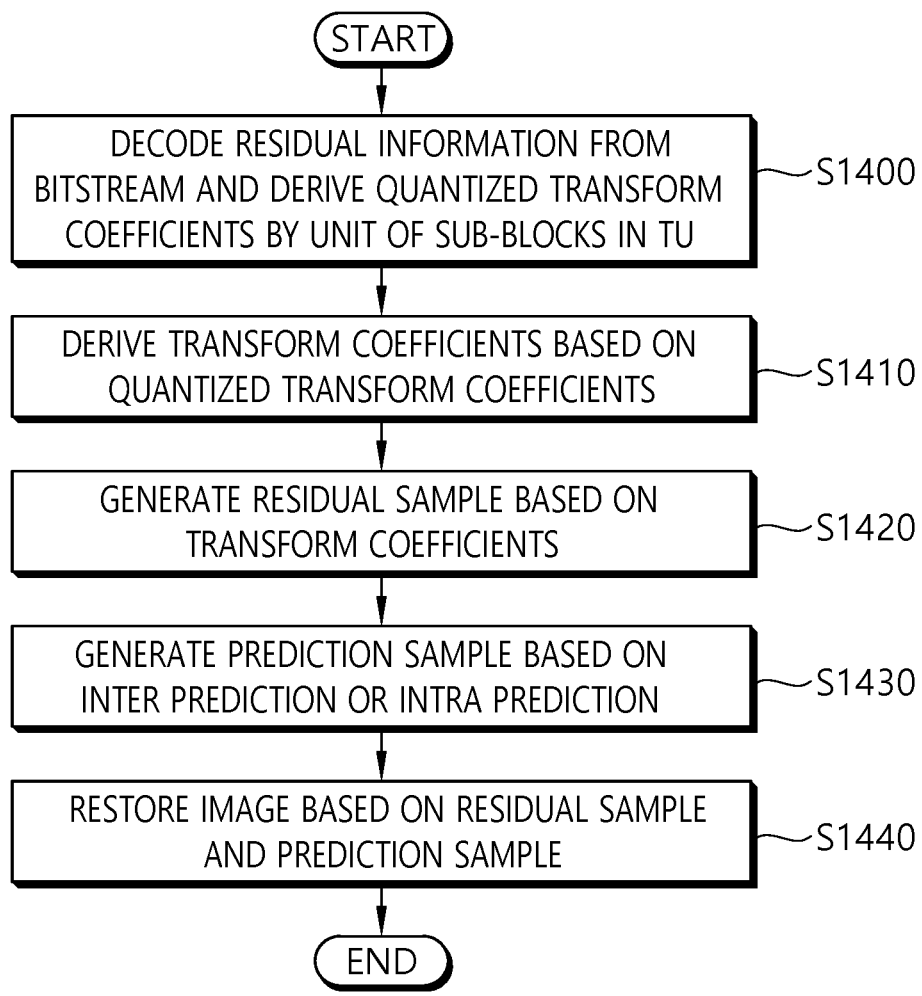
FIG. 14 schematically illustrates an example of an image decoding method by a decoding device according to the present invention.

FIG. 14 schematically illustrates an example of an image decoding method by a decoding device according to the present invention. The method disclosed in FIG. 14 may be performed by the decoding device disclosed in FIG. 2. Specifically, for example, S1400 of FIG. 14 may be performed by an entropy decoding unit of the decoding device, S1410 may be performed by an dequantizer of the encoding device, S1420 may be performed by an inverse transformer of the decoding device, S1430 may be performed by the predictor of the decoding device, and S1440 may be performed by an adder of the decoding device.

Referring to FIG. 14, the decoding device derives transform coefficients quantized by unit of sub-block in the TU based on residual information included in a bitstream (S1400). The decoding device may decode the bit stream received from the encoding device and obtain the residual mode information. The bitstream may be received via the network or the storage medium.

The decoding device may decode the quantized transform coefficients by unit of sub-block based on the method described above with reference to FIGS. 3 and 9.

The decoding device may divide the TU into the plurality of sub-blocks having the size of 8×8 or larger. For example, when the size of the TU is 64×64 or larger, the decoding device may divide the TU into the plurality of sub-blocks having the size of 8×8 or larger.

The quantized transform coefficients may be sequentially decoded based on the specific scan order within the sub-block.

For example, the quantized transform coefficients may be sequentially decoded based on the up-right diagonal scan order from the upper left position of the sub-block.

As an example, the residual information may include the information indicating the non-zero quantization transform coefficients of the sub-block. In this case, the information indicating the non-zero quantization transform coefficients may indicate whether the absolute values of the quantization transform coefficients are 0 sequentially based on the up-right diagonal scan order from the upper left position of the sub-block.

Further, for the sub-blocks of the first group among the sub-blocks in the TU, the decoding device may decode the quantized transform coefficients based on the up-right diagonal scan order from the upper left position of the sub-block and for the sub-blocks of the second group among the sub-blocks in the TU, the decoding device may decode the quantized transform coefficients based on the reverse order of the up-right diagonal scan order from the lower right position of the sub-block. Herein, the sub-blocks of the first group may include upper left sub-blocks of the TU.

The criterion for dividing the sub sub-blocks of the first group and the sub-blocks of the second group may be predetermined. Alternatively, the encoding device may signal information indicating a specific horizontal axis and/or vertical axis to the decoding device. For example, the decoding device may receive division information indicating a specific x-coordinate and/or y-coordinate in the TU through the bitstream. In this case, the sub-blocks positioned on a left side of the specific x coordinate and/or on an upper side of the specific y coordinate may belong to the first group and the remaining sub-blocks may belong to the second group. As another example, the decoding device may receive information indicating an n-th sub-block in an x axis and/or an m-th sub-block in a y axis through the bitstream. In this case, the left sub-blocks of the n-th sub-block (included or not included) on the x-axis and/or the upper sub-blocks of the m-th sub-block (included or not included) may belong to the first group and the remaining sub-blocks may belong to the second group.

As another example, the residual information may include the information indicating the non-zero quantization transform coefficients of the sub-block and the flag information indicating whether the absolute values of all of the non-zero quantization transform coefficients in the sub-block are 1. In this case, the decoding device may sequentially detect whether the absolute values of the quantization transform coefficients are 0 based on the specific scan order from the lower-right position of the sub-block based on the information indicating the non-zero quantization transform coefficients and detect whether the absolute values of all of the non-zero quantization transform coefficients of the sub-block are 1 based on the flag information. The residual information may further include the information indicating the signs of the non-zero quantization transform coefficients in the sub-block. When the value of the flag information is 1, the decoding device may detect the signs of the quantization transform coefficients larger than 0 based on the information indicating the signs of the quantization transform coefficients larger than 0.

As yet another example, the residual information may include the information indicating the non-zero quantization transform coefficients of the sub-block and the flag information indicating whether the absolute values of all of the non-zero AC component quantization transform coefficients in the sub-block are 1. In this case, the decoding device may sequentially detect whether the absolute values of the quantization transform coefficients are 0 based on the specific scan order from the lower-right position of the sub-block based on the information indicating the non-zero quantization transform coefficients and detect whether the absolute values of all of the non-zero AC component quantization transform coefficients excluding the DC component quantization transform coefficients of the sub-block are 1 based on the flag information. The residual information may further include information indicating whether the absolute value of the quantization transform coefficient of the DC component is larger than 1. In this case, the decoding device may derive the absolute value of the DC component quantization transform coefficient based on the information indicating whether the absolute value of the quantization transform coefficient of the DC component is larger than 1. For example, the residual information may includes at least one of information indicating whether the absolute value of the quantization transform coefficient of the DC component is larger than 1, information indicating whether the absolute value of the quantization transform coefficient of the DC component is larger than 2, information indicating the sign of the quantization transform coefficient, and information indicating the (remaining) absolute value of the quantization transform coefficient of the DC component. In this case, the decoding device may decode information indicating whether the absolute value of the quantization transform coefficient of the DC component is larger than 2 when the absolute value of the quantization transform coefficient of the DC component is larger than 1 and decode information indicating the (remaining) absolute value of the quantization transform coefficient of the DC component when the absolute value of the quantization transform coefficient of the DC component is larger than 2. Further, the decoding device may generate information indicating the sign of the quantization transform coefficient of the DC component. Based on the decoded information, the decoding device may derive the value of the quantization transform coefficient of the DC component.

The decoding device derives quantized transform coefficients based on the quantized transform coefficients (S1410). The decoding device may obtain the transform coefficients by inversely quantizing the quantized transform coefficients. In this case, inverse quantization may be performed by unit of TU.

The decoding device generates the residual sample based on the transform coefficients (S1420). The decoding device may generate the residual sample by inversely quantizing the transform coefficients. In this case, the inverse quantization may be performed by unit of TU.

The decoding device generates prediction samples based on inter prediction or intra prediction (S1430). The decoding device may determine inter prediction or intra prediction by unit of CU and determine an inter prediction mode or an intra prediction mode by unit of PU. Specifically, the decoding device may determine whether a merge mode or an AMVP mode is applied among the inter prediction modes by unit of PU based on RD cost. Further, the decoding device may determine whether to apply a specific directional prediction mode, a planar mode, or a DC mode among the intra prediction modes by unit of PU.

When performing the intra prediction, the decoding device may determine the intra prediction mode by unit of PU and generate the prediction samples using surrounding reference samples by unit of TU based on the determined intra prediction mode.

The decoding device may receive the prediction mode information from the encoding device and determine whether to perform the inter prediction or the intra prediction based on the prediction mode information. In this case, the bitstream may include the prediction mode information.

The decoding device generates a restored image based on the residual sample and the prediction sample (S1440). The decoding device may generate restoration samples by adding the residual samples and the prediction samples and may generate restored blocks and restored pictures based on the restoration samples.

According to the present invention, it is possible to increase coding efficiency of the residual signal. According to the present invention, transform coefficients can be derived by using less bits. As a result, a quantity of data required for a residual signal can be reduced, and an overall coding efficiency can be improved. Further, according to the present invention, calculation complexity can be simplified and a processing speed can be enhanced in scanning and coding the transform coefficients.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An image decoding method performed by a decoding device, comprising:
deriving quantized transform coefficients by unit of sub-blocks in a transform unit based on residual information included in a bitstream;
deriving transform coefficients based on the quantized transform coefficients;
generating a residual sample based on the transform coefficients;
generating a prediction sample based on an inter prediction or an intra prediction; and
restoring an image based on the residual sample and the prediction sample,
wherein each sub-block included in a first group among the sub-blocks in the TU uses an up-right diagonal scan order, wherein the quantized transform coefficients of a sub-block included in the first group are decoded according to the up-right diagonal scan order from an upper left position to a lower right position,
wherein each sub-block included in a second group among the sub-blocks in the TU uses a reverse order of the up-right diagonal scan order, wherein the quantized transform coefficients of a sub-block included in the second group are decoded according to the reverse order of the up-right diagonal scan order from a lower right position to an upper left position, and
wherein the first group includes upper left sub-blocks in the TU.

2. The decoding method of claim 1, further comprising:
dividing the TU into multiple sub-blocks,
wherein the sub-blocks have a size of 8×8 or larger.

3. The decoding method of claim 2, wherein when the size of the TU is 64×64 or larger, the sub-blocks divided from the TU have a size of 8×8 or larger.

4. The decoding method of claim 1, wherein the residual information includes the information indicating non-zero quantization transform coefficients of the sub-block and flag information indicating whether the absolute values of all of the non-zero quantization transform coefficients in the sub-block are 1, and
the deriving of the quantized transform coefficients by unit of sub-blocks includes,
detecting whether the absolute values of the quantization transform coefficients are 0 sequentially based on a specific scan order from the lower right position of the sub-block based on the information indicating the non-zero quantization transform coefficients, and
detecting whether the absolute values of all of the non-zero quantization transform coefficients in the sub-block are 1 based on the flag information.

5. The decoding method of claim 4, wherein the residual information further includes information indicating signs of the non-zero quantization transform coefficients in the sub-block, and
the deriving of the quantized transform coefficients by unit of sub-blocks further includes
detecting the signs of the quantization transform coefficients larger than 0 based on information indicating the signs of the quantization transform coefficients larger than 0 when a value of the flag information is 1.

6. The decoding method of claim 1, wherein the residual information includes the information indicating non-zero quantization transform coefficients of the sub-block and flag information indicating whether the absolute values of all non-zero AC component quantization transform coefficients in the sub-block are 1, the sub-block including DC component quantization transform coefficients, and
the deriving of the quantized transform coefficients by unit of sub-blocks includes
detecting whether the absolute values of the quantization transform coefficients are 0 sequentially based on a specific scan order from the lower right position of the sub-block based on the information indicating the non-zero quantization transform coefficients, and detecting whether the absolute values of all of the non-zero AC component quantization transform coefficients excluding DC component quantization transform coefficient of the sub-block are 1 based on the flag information.

7. The decoding method of claim 6, wherein the residual information further includes information indicating whether the absolute value of the DC component quantization transform coefficient is larger than 1, and the deriving of the quantized transform coefficients by unit of sub-blocks includes deriving the absolute value of the DC component quantization transform coefficient based on the information indicating whether the absolute value of the DC component quantization transform coefficient is larger than 1.

8. An image encoding method performed by an encoding device, comprising:

generating a prediction sample based on an inter prediction or an intra prediction;

generating a residual sample based on a comparison of an original sample and the prediction sample;

deriving transform coefficients based on the residual sample;

deriving quantized transform coefficients based on the transform coefficients; and encoding and outputting residual information for the quantized transform coefficients by unit of sub-blocks in a transform unit (TU), wherein each sub-block included in a first group among the sub-blocks in the TU uses an up-right diagonal scan order, wherein the quantized transform coefficients of a sub-block included in the first group are encoded according to the up-right diagonal scan order from an upper left position to a lower right position, wherein each sub-block included in a second group among the sub-blocks in the TU uses a reverse order of the up-right diagonal scan order, wherein the quantized transform coefficients of a sub-block included in the second group are encoded according to the reverse order of the up-right diagonal scan order from a lower right position to an upper left position, and wherein the first group includes upper left sub-blocks in the TU.

* * * * *